US012632852B2

(12) United States Patent
Glynn-Udrow et al.

(10) Patent No.: US 12,632,852 B2
(45) Date of Patent: May 19, 2026

(54) SYSTEM AND METHOD FOR DIGITAL WALLET MANAGEMENT

(71) Applicant: The Toronto-Dominion Bank, Toronto (CA)

(72) Inventors: Nolan Glynn-Udrow, Toronto (CA); Sahana Dorai, Mississauga (CA); Imran Ahmed Khan, Mississauga (CA); Maryam Karbasi, Toronto (CA); Peter Horvath, Toronto (CA)

(73) Assignee: The Toronto-Dominion Bank, Toronto (CA)

( * ) Notice: Subject to any disclaimer, the term of this patent is extended or adjusted under 35 U.S.C. 154(b) by 469 days.

(21) Appl. No.: 17/063,054

(22) Filed: Oct. 5, 2020

(65) Prior Publication Data

US 2022/0108304 A1     Apr. 7, 2022

(51) Int. Cl.
| | |
|---|---|
| *G06Q 20/36* | (2012.01) |
| *G06Q 20/34* | (2012.01) |
| *G06Q 20/40* | (2012.01) |
| *G06Q 30/018* | (2023.01) |
| *G06Q 40/02* | (2023.01) |
| *H04L 9/40* | (2022.01) |
| *G06F 3/0482* | (2013.01) |

(52) U.S. Cl.
CPC ......... *G06Q 20/3672* (2013.01); *G06Q 20/34* (2013.01); *G06Q 20/3674* (2013.01); *G06Q 20/3676* (2013.01); *G06Q 20/40145* (2013.01); *G06Q 30/0185* (2013.01); *G06Q 40/02* (2013.01); *H04L 63/083* (2013.01); *H04L 63/0861* (2013.01); *G06F 3/0482* (2013.01)

(58) Field of Classification Search
CPC .... G06Q 20/363; G06Q 20/405; H04L 63/10; G06F 8/61
See application file for complete search history.

(56) References Cited

U.S. PATENT DOCUMENTS

| | | | |
|---|---|---|---|
| 9,454,758 | B2 | 9/2016 | Desai et al. |
| 9,978,062 | B2 | 5/2018 | Raj et al. |
| 10,510,055 | B2 | 12/2019 | Desai et al. |
| 10,607,442 | B2 | 3/2020 | Toohey et al. |

(Continued)

*Primary Examiner* — Ryan D Donlon
*Assistant Examiner* — Amanulla Abdullaev
(74) *Attorney, Agent, or Firm* — Rowand LLP

(57) ABSTRACT

A server comprises a communications module; a processor coupled with the communications module; and a memory coupled to the processor and storing processor-executable instructions which, when executed by the processor, configure the processor to provide, via the communications module and to a remote computing device, a signal causing the remote computing device to display an interface of a digital wallet management application, the interface allowing one or more digital wallets to be selected; receive, via the communications module and from the remote computing device, a signal indicating a selection of the one or more digital wallets; receive, via the communications module and from the remote computing device, a signal indicating a request to push account information to the selected one or more digital wallets; and send, via the communications module and to one or more servers associated with the one or more digital wallets, a signal configuring the one or more servers to add the account information to the one or more digital wallets.

18 Claims, 14 Drawing Sheets

100

(56) References Cited

U.S. PATENT DOCUMENTS

| 10,929,841 | B1 * | 2/2021 | Kalaboukis | G06Q 20/363 |
|---|---|---|---|---|
| 2011/0154135 | A1 * | 6/2011 | Tyhurst | G06F 8/61 |
| | | | | 717/177 |
| 2015/0039455 | A1 | 2/2015 | Luciani | |
| 2015/0081554 | A1 | 3/2015 | Wong et al. | |
| 2015/0254645 | A1 * | 9/2015 | Bondesen | G06Q 20/385 |
| | | | | 705/41 |
| 2015/0254648 | A1 | 9/2015 | Clements et al. | |
| 2015/0254698 | A1 * | 9/2015 | Bondesen | G06Q 20/36 |
| | | | | 705/14.17 |
| 2015/0254699 | A1 * | 9/2015 | Bondesen | G06Q 20/20 |
| | | | | 705/14.17 |
| 2016/0173483 | A1 * | 6/2016 | Wong | H04W 12/06 |
| | | | | 726/9 |
| 2016/0180332 | A1 * | 6/2016 | Wilczynski | G06Q 20/36 |
| | | | | 705/41 |
| 2017/0278085 | A1 | 9/2017 | Anderson et al. | |
| 2019/0259023 | A1 * | 8/2019 | Candee | G06Q 20/40 |
| 2019/0266604 | A1 * | 8/2019 | Desai | G06Q 30/06 |

* cited by examiner

100

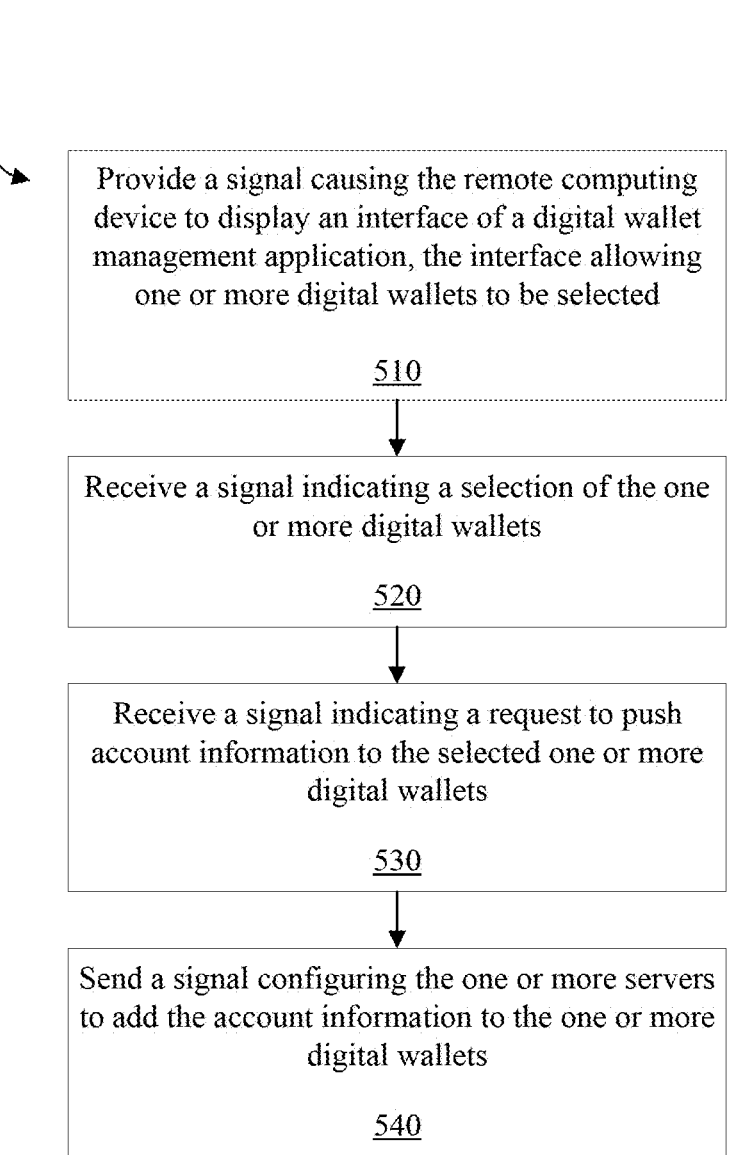

500

Provide a signal causing the remote computing device to display an interface of a digital wallet management application, the interface allowing one or more digital wallets to be selected

510

Receive a signal indicating a selection of the one or more digital wallets

520

Receive a signal indicating a request to push account information to the selected one or more digital wallets

530

Send a signal configuring the one or more servers to add the account information to the one or more digital wallets

Please select which digital wallets you
would like to update:

DIGITAL WALLET A

DIGITAL WALLET B

NEXT STEP

900

910

920

930

940

950

1000

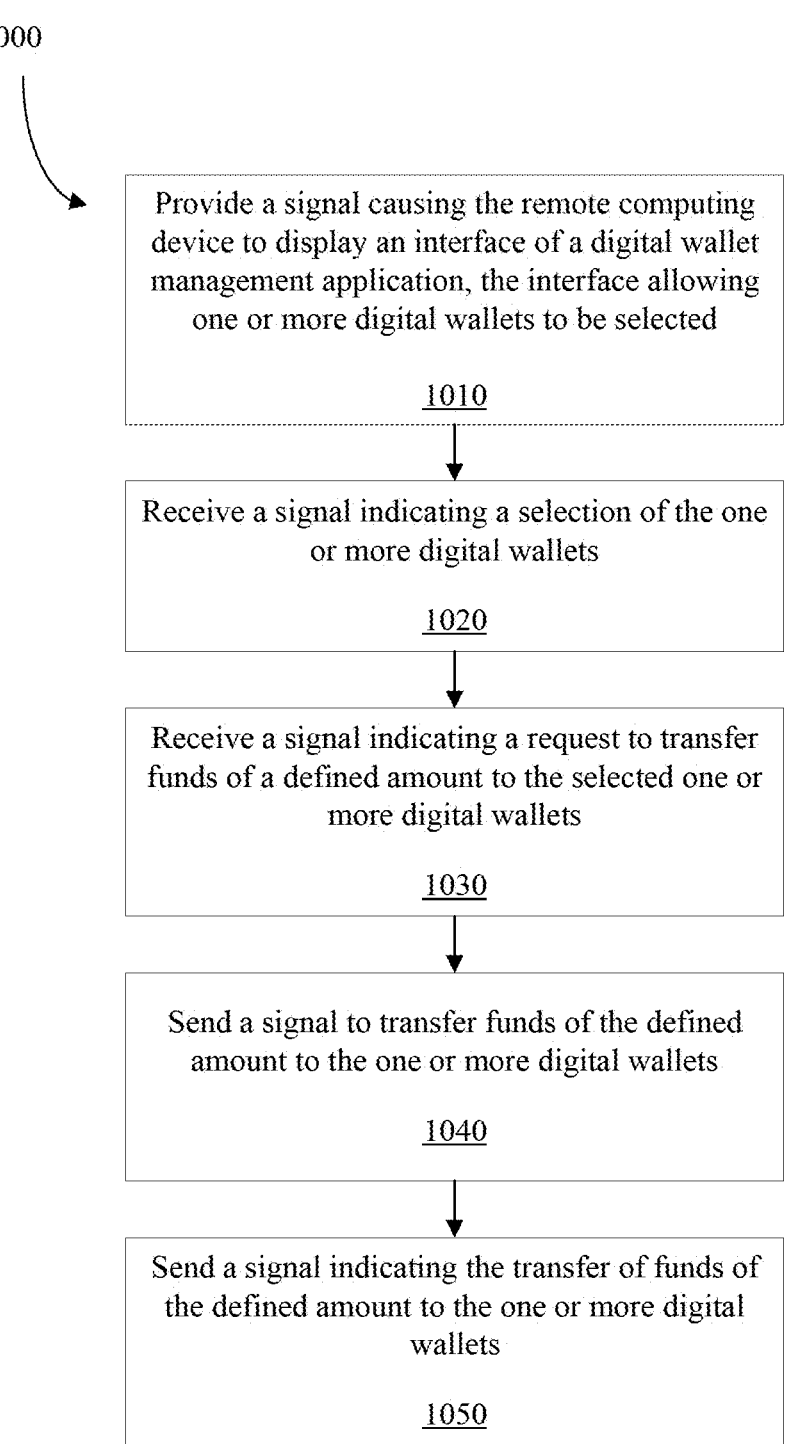

Provide a signal causing the remote computing device to display an interface of a digital wallet management application, the interface allowing one or more digital wallets to be selected

1010

Receive a signal indicating a selection of the one or more digital wallets

1020

Receive a signal indicating a request to transfer funds of a defined amount to the selected one or more digital wallets

1030

Send a signal to transfer funds of the defined amount to the one or more digital wallets

1040

Send a signal indicating the transfer of funds of the defined amount to the one or more digital wallets

DIGITAL WALLET MANAGEMENT APPLICATION

ADD NEW PAYMENT CARD

REMOVE A PAYMENT CARD

EDIT A PAYMENT CARD

UPDATE PERSONAL INFORMATION

FUND ONE OR MORE DIGITAL WALLETS

ADD A DIGITAL WALLET

DIGITAL WALLET A     DIGITAL WALLET B

1500

SYSTEM AND METHOD FOR DIGITAL WALLET MANAGEMENT

TECHNICAL FIELD

The present application relates to digital wallets and, more particularly, to systems and methods for digital wallet management.

BACKGROUND

Digital wallets or digital wallet applications are often linked to one or more payment cards and are used for processing payments. When a user wishes to add or update a payment card to a digital wallet, the user is required to log into an account associated with the digital wallet and enter the payment card information. This process may be difficult and time consuming as the user is required to navigate within the digital wallet to find the appropriate setting to add or update a new payment card.

This process is even more time consuming when a user wishes to add or update a payment card to multiple digital wallets. For example, when a user wishes to add or update a payment card to multiple digital wallets, the user is required to separately log into each account associated with each digital wallet and enter the payment card information.

BRIEF DESCRIPTION OF THE DRAWINGS

Embodiments are described in detail below, with reference to the following drawings:

FIG. 5 is a flowchart showing operations performed by a server in digital wallet management according to an embodiment;

FIG. 10 is a flowchart showing operations performed by a server in digital wallet management according to an embodiment;

Like reference numerals are used in the drawings to denote like elements and features.

DETAILED DESCRIPTION OF VARIOUS EMBODIMENTS

Figure 1:
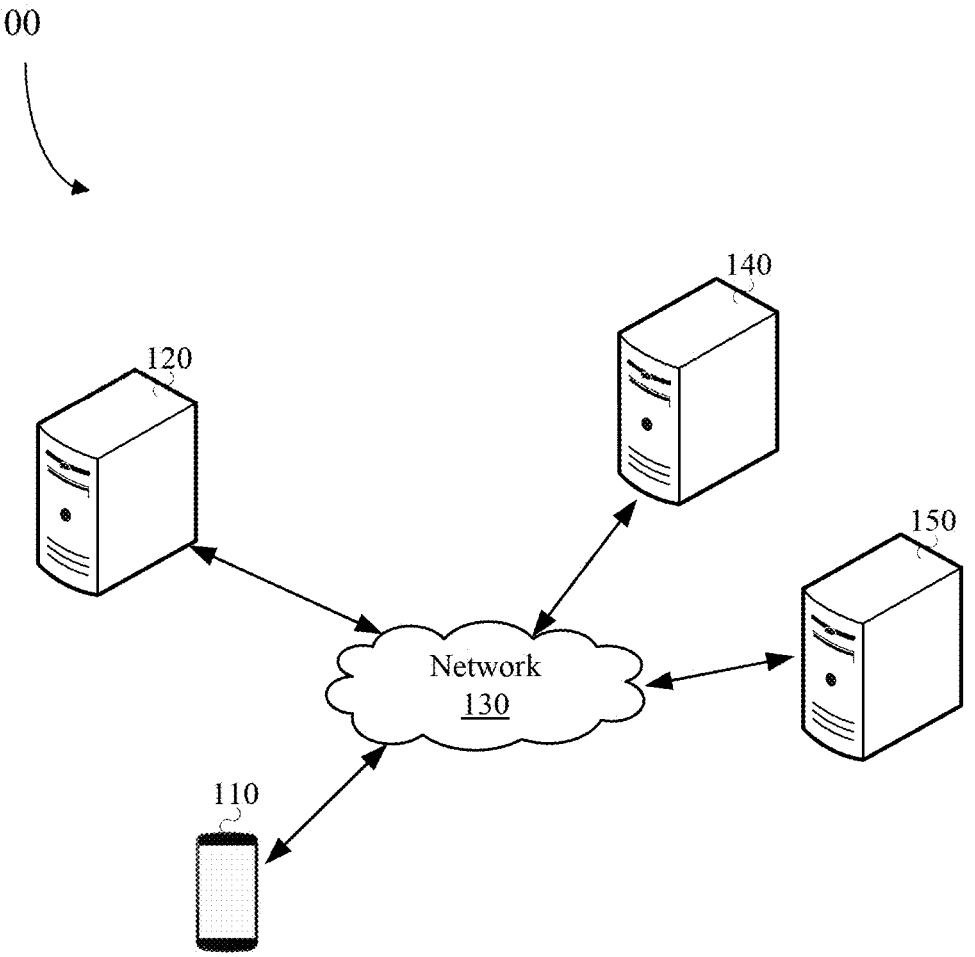
FIG. 1 is a schematic operation diagram illustrating an operating environment of an example embodiment.

Accordingly, in one aspect there is provided a server comprising a communications module; a processor coupled with the communications module; and a memory coupled to the processor and storing processor-executable instructions which, when executed by the processor, configure the processor to provide, via the communications module and to a remote computing device, a signal causing the remote computing device to display an interface of a digital wallet management application, the interface allowing one or more digital wallets to be selected; receive, via the communications module and from the remote computing device, a signal indicating a selection of the one or more digital wallets; receive, via the communications module and from the remote computing device, a signal indicating a request to push account information to the selected one or more digital wallets; and send, via the communications module and to one or more servers associated with the one or more digital wallets, a signal configuring the one or more servers to add the account information to the one or more digital wallets.

In one or more embodiments, the signal indicating the selection of the one or more digital wallets indicates the selection of at least two digital wallets and wherein the signal configuring the one or more servers to add the account information to the one or more digital wallets configures the one or more servers to add the account information to the at least two digital wallets.

In one or more embodiments, the processor-executable instructions, when executed by the processor, further configure the processor to authenticate a user of the remote computing device; and automatically add the account information to the digital wallet management application based on authentication information obtained during the authentication.

In one or more embodiments, the authentication information includes at least one of a username, a password, or biometric data of the user.

In one or more embodiments, the processor-executable instructions, when executed by the processor, further configure the processor to receive, via the communications module and from the remote computing device, a signal representing a request to transfer funds of a defined amount to one or more of the digital wallets; in response to receiving the signal representing the request to transfer funds of the defined amount, send, via the communications module and to a server associated with the account information, a signal to transfer funds of the defined amount to the one or more digital wallets; and send, via the communications module and to the one or more servers associated with the one or more digital wallets, a signal indicating the transfer of funds of the defined amount to the one or more digital wallets.

In one or more embodiments, the signal representing the request to transfer funds of the defined amount to one or more of the digital wallets includes information identifying the account information to be used to transfer the funds to the one or more digital wallets.

In one or more embodiments, the processor-executable instructions, when executed by the processor, further configure the processor to send, via the communications module and to the remote computing device, a signal requesting the user to authenticate at the one or more servers associated with the one or more digital wallets.

In one or more embodiments, the signal requesting the user to authenticate at the one or more servers associated with the one or more digital wallets causes the remote computing device to display an interface requesting authentication information for the one or more servers associated with the one or more digital wallets.

In one or more embodiments, the interface requesting authentication information is displayed within the digital wallet management application.

In one or more embodiments, the interface of the digital wallet management application includes one or more icons displaying information regarding the one or more digital wallets, the one or more icons selectable to open a mobile application associated with a particular digital wallet.

In one or more embodiments, the account information includes payment card information.

According to another aspect there is provided a computer-implemented method comprising providing, via a communications module and to a remote computing device, a signal causing the remote computing device to display an interface of a digital wallet management application, the interface allowing one or more digital wallets to be selected; receiving, via the communications module and from the remote computing device, a signal indicating a selection of the one or more digital wallets; receiving, via the communications module and from the remote computing device, a signal indicating a request to push account information to the selected one or more digital wallets; and sending, via the communications module and to one or more servers associated with the one or more digital wallets, a signal configuring the one or more servers to add the account information to the one or more digital wallets.

In one or more embodiments, the signal indicating the selection of the one or more digital wallets indicates the selection of at least two digital wallets and wherein the signal configuring the one or more servers to add the account information to the one or more digital wallets configures the one or more servers to add the account information to the at least two digital wallets.

In one or more embodiments, the method further comprises authenticating a user of the remote computing device; and automatically adding the account information to the digital wallet management application based on authentication information obtained during the authentication.

In one or more embodiments, the authentication information includes at least one of a username, a password, or biometric data of the user.

In one or more embodiments, the method further comprises receiving, via the communications module and from the remote computing device, a signal representing a request to transfer funds of a defined amount to one or more of the digital wallets; in response to receiving the signal representing the request to transfer funds of the defined amount, sending, via the communications module and to a server associated with the account information, a signal to transfer funds of the defined amount to the one or more digital wallets; and send, via the communications module and to the one or more servers associated with the one or more digital wallets, a signal indicating the transfer of funds of the defined amount to the one or more digital wallets.

In one or more embodiments, the method further comprises sending, via the communications module and to the remote computing device, a signal requesting the user to authenticate at the one or more servers associated with the one or more digital wallets.

In one or more embodiments, the signal requesting the user to authenticate at the one or more servers associated with the one or more digital wallets causes the remote computing device to display an interface requesting authentication information for the one or more servers associated with the one or more digital wallets.

In one or more embodiments, the account information includes payment card information.

According to another aspect there is provided a non-transitory computer readable storage medium comprising computer-executable instructions which, when executed, configure a processor to provide, via a communications module and to a remote computing device, a signal causing the remote computing device to display an interface of a digital wallet management application, the interface allowing one or more digital wallets to be selected; receive, via the communications module and from the remote computing device, a signal indicating a selection of the one or more digital wallets; receive, via the communications module and from the remote computing device, a signal indicating a request to push account information to the selected one or more digital wallets; and send, via the communications module and to one or more servers associated with the one or more digital wallets, a signal configuring the one or more servers to add the account information to the one or more digital wallets.

Other aspects and features of the present application will be understood by those of ordinary skill in the art from a review of the following description of examples in conjunction with the accompanying figures.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . or . . . " is intended to cover any one or more of the listed elements, including any one of the listed elements alone, any sub-combination, or all of the elements, without necessarily excluding any additional elements, and without necessarily requiring all of the elements.

FIG. 1 is a schematic operation diagram illustrating an operating environment of an example embodiment. As shown, the system 100 includes a computing device 110 and a server 120 coupled to one another through a network 130, which may include a public network such as the Internet and/or a private network. The computing device 110 and the server 120 may be in geographically disparate locations. Put differently, the computing device 110 and the server 120 may be located remote from one another.

The server 120 is a computer system. The server 120 may be referred to as an application server 120 and may be associated with an application (such as a web or mobile application) that is resident on the computing device 110. For example, the application server 120 may connect the computing device 110 to a back-end system associated with an application. The application may be a digital wallet management application. When the application is resident on the computing device 110, the application server 120 is connected to the computing device 110 via the network 130.

Although not shown, the server 120 may communicate with one or more application programming interfaces (APIs) which allows the server 120 to push data such as for example account information and/or transfer funds to one or more third party applications. As will be described in more detail below, the account information may include payment card information and the third party applications may include one or more digital wallets.

The computing device 110 may take a variety of forms such as a smartphone, a tablet computer, a wearable computer such as a head-mounted display or smartwatch, a laptop or desktop computer, or a computing device of another type.

The computing device 110 is adapted to present a graphical user interface that allows for communication with the application server 120. For example, the computing device 110 may be adapted to receive, from the server 120, a signal that causes the computing device 110 to display an interface of a digital wallet management application.

The network 130 is a computer network. In some embodiments, the network 130 may be an internetwork such as may be formed of one or more interconnected computer networks. For example, the network 130 may be or may include an Ethernet network, an asynchronous transfer mode (ATM) network, a wireless network, a telecommunications network, or the like.

The system 100 also includes one or more servers associated with one or more digital wallets. The one or more digital wallets, which may also be referred to as digital wallet applications, may be resident on the computing device 110. In this embodiment, the system 100 includes a server 140 associated with a first digital wallet and a server 150 associated with a second digital wallet. The first digital wallet and the second digital wallet are resident on the computing device 110 and as such server 140 and server 150 are connected to the computing device 110 via the network 130. Although not shown, the server 140 and server 150 may communicate with one or more APIs which allows the server 120 to push data such as for example account information and/or transfer funds thereto.

Figure 2:
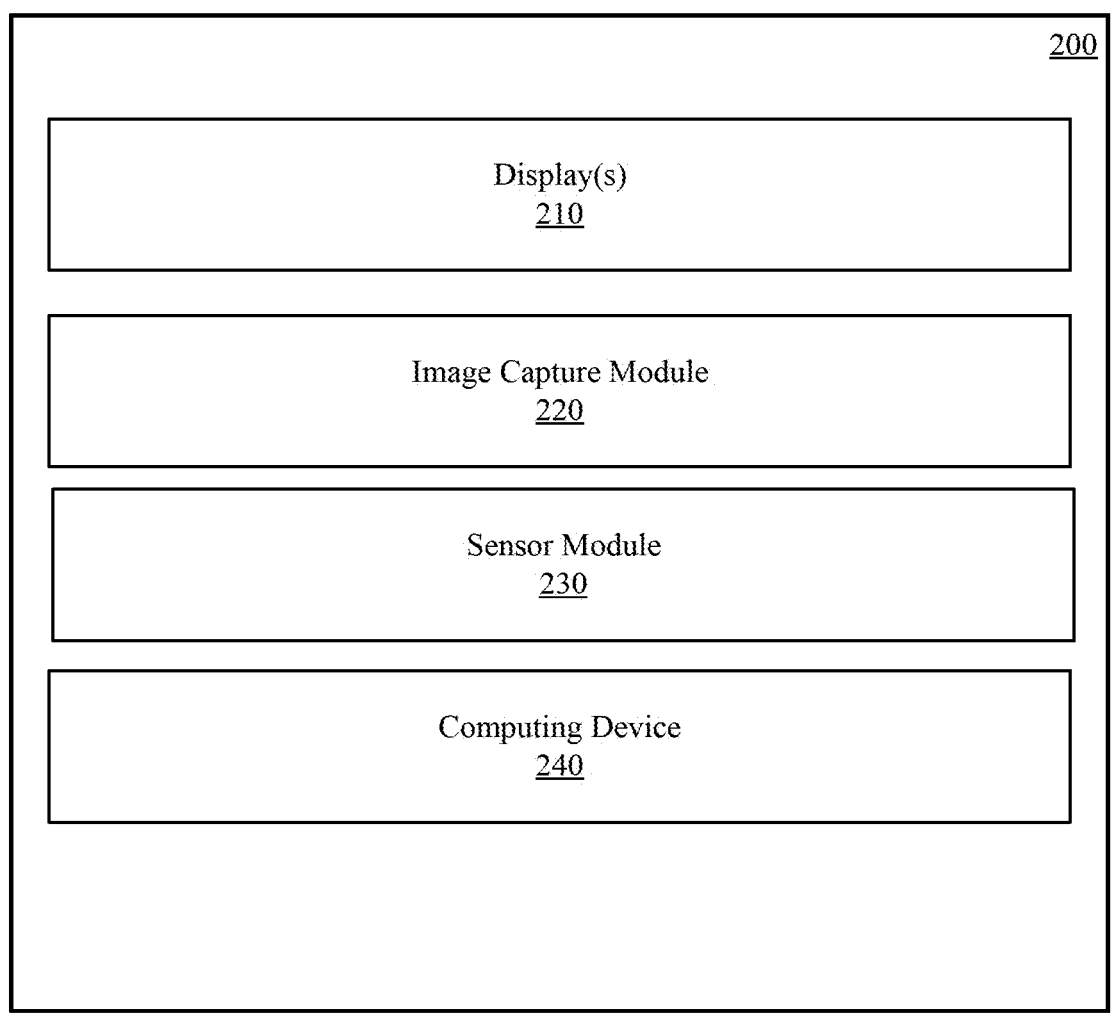
FIG. 2 is a simplified schematic diagram showing components of a computing device.

FIG. 2 is a simplified schematic diagram showing component of an exemplary computing device 200. Computing device 110 may be of the same type as computing device 200. The computing device 200 may include modules including, as illustrated, for example, one or more displays 210, an image capture module 220, a sensor module 230, and a computer device 240.

The one or more displays 210 are a display module. The one or more displays 210 are used to display screens of a graphical user interface that may be used, for example, to communicate with the server 120 (FIG. 1). The one or more displays 210 may be internal displays of the computing device 200 (e.g., disposed within a body of the computing device).

The image capture module 220 may be or may include a camera. The image capture module 220 may be used to obtain image data, such as images. The image capture module 220 may be or may include a digital image sensor system as, for example, a charge coupled device (CCD) or a complementary metal-oxide-semiconductor (CMOS) image sensor.

The sensor module 230 may be a sensor that generates sensor data based on a sensed condition. By way of example, the sensor module 230 may be or include a location subsystem which generates location data indicating a location of the computing device 200. The location may be the current geographic location of the computing device 200. The location subsystem may be or include any one or more of a global positioning system (GPS), an inertial navigation system (INS), a wireless (e.g., cellular) triangulation system, a beacon-based location system (such as a Bluetooth low energy beacon system), or a location subsystem of another type.

The computer device 240 is in communication with the one or more displays 210, the image capture module 220, and the sensor module 230. The computer device 240 may be or may include a processor which is coupled to the one or more displays 210, the image capture module 220, and/or the sensor module 230.

Figure 3:
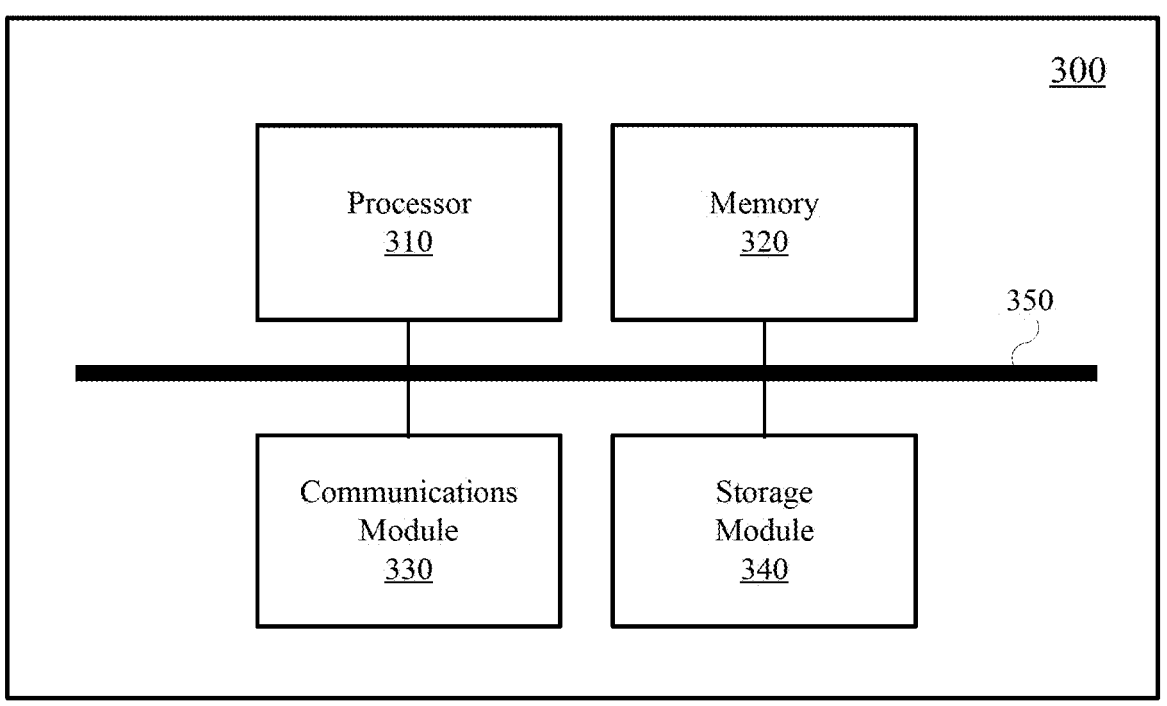
FIG. 3 is a high-level schematic diagram of an example computing device.

Referring now to FIG. 3, a high-level operation diagram of an example computer device 300 is shown. In some embodiments, the computer device 300 may be exemplary of the computer device 240 (FIG. 2), the application server 120, server 140 and/or server 150.

The example computer device 300 includes a variety of modules. For example, as illustrated, the example computer device 300 may include a processor 310, a memory 320, a communications module 330, and/or a storage module 340. As illustrated, the foregoing example modules of the example computer device 300 are in communication over a bus 350.

The processor 310 is a hardware processor. The processor 310 may, for example, be one or more ARM, Intel x86, PowerPC processors or the like.

The memory 320 allows data to be stored and retrieved. The memory 320 may include, for example, random access memory, read-only memory, and persistent storage. Persistent storage may be, for example, flash memory, a solid-state drive or the like. Read-only memory and persistent storage are a non-transitory computer-readable storage medium. A computer-readable medium may be organized using a file system such as may be administered by an operating system governing overall operation of the example computer device 300.

The communications module 330 allows the example computer device 300 to communicate with other computer or computing devices and/or various communications networks. For example, the communications module 330 may allow the example computer device 300 to send or receive communications signals. Communications signals may be sent or received according to one or more protocols or according to one or more standards. For example, the communications module 330 may allow the example computer device 300 to communicate via a cellular data network, such as for example, according to one or more standards such as, for example, Global System for Mobile Communications (GSM), Code Division Multiple Access (CDMA), Evolution Data Optimized (EVDO), Long-term Evolution (LTE) or the like. Additionally or alternatively, the communications module 330 may allow the example computer device 300 to communicate using near-field communication (NFC), via Wi-Fi™, using Bluetooth™ or via some combination of one or more networks or protocols. In some embodiments, all or a portion of the communications module 330 may be integrated into a component of the example computer device 300. For example, the communications module may be integrated into a communications chipset. In some embodiments, the communications module 330 may be omitted such as, for example, if sending and receiving communications is not required in a particular application.

The storage module 340 allows the example computer device 300 to store and retrieve data. In some embodiments, the storage module 340 may be formed as a part of the memory 320 and/or may be used to access all or a portion of the memory 320. Additionally or alternatively, the storage module 340 may be used to store and retrieve data from persisted storage other than the persisted storage (if any) accessible via the memory 320. In some embodiments, the storage module 340 may be used to store and retrieve data in a database. A database may be stored in persisted storage. Additionally or alternatively, the storage module 340 may access data stored remotely such as, for example, as may be accessed using a local area network (LAN), wide area network (WAN), personal area network (PAN), and/or a storage area network (SAN). In some embodiments, the storage module 340 may access data stored remotely using the communications module 330. In some embodiments, the storage module 340 may be omitted and its function may be performed by the memory 320 and/or by the processor 310 in concert with the communications module 330 such as, for example, if data is stored remotely. The storage module may also be referred to as a data store.

Software comprising instructions is executed by the processor 310 from a computer-readable medium. For example, software may be loaded into random-access memory from persistent storage of the memory 320. Additionally or alternatively, instructions may be executed by the processor 310 directly from read-only memory of the memory 320.

Figure 4:
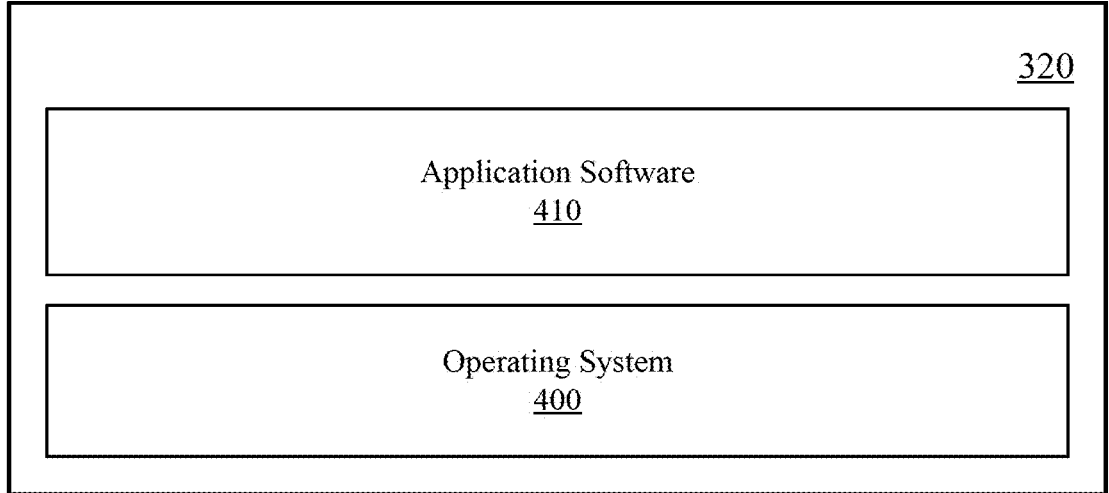
FIG. 4 shows a simplified organization of software components stored in a memory of the example computing device of FIG. 3.

FIG. 4 depicts a simplified organization of software components stored in the memory 320 of the example computer device 300 (FIG. 3). As illustrated, these software components include an operating system 400 and an application 410.

The operating system 400 is software. The operating system 400 allows the application 410 to access the processor 310 (FIG. 3), the memory 320, and the communications module 330 of the example computer device 300 (FIG. 3). The operating system 400 may be, for example, Google™ Android™, Apple™ iOS™, UNIX™, Linux™, Microsoft™ Windows™, Apple OSX™ or the like.

The application 410 adapts the example computer device 300, in combination with the operating system 400, to operate as a device performing a particular function. For example, the application 410 may cooperate with the operating system 400 to adapt a suitable embodiment of the example computer device 300 to operate as the computer device 240 (FIG. 2) and/or the server 120.

While a single application 410 is illustrated in FIG. 3, in operation the memory 320 may include more than one application 410 and different applications 410 may perform different operations. For example, in at least some embodiments in which the computer device 300 is functioning as the computing device 110, the applications 410 may include a digital wallet management application. The digital wallet management application may be configured for secure communications with the application server 120 and may provide various digital wallet management functions such as for example the ability to push account information to one or more servers associated with one or more digital wallets resident on the computing device 110.

By way of further example, in at least some embodiments in which the computer device 300 functions as the computing device 110, the applications 410 may include one or more digital wallets. In at least some such embodiments, a first digital wallet may be associated with server 140 and a second digital wallet may be associated with server 150. The first digital wallet and the second digital wallet may be linked to one or more payment cards and may be used for payment. The first digital wallet and/or the second digital wallet may be pre-funded digital wallets and as such in some embodiments the first digital wallet and/or the second digital wallet may receive funds from an account via the digital wallet management application.

When a user wishes to update or add account information such as for example payment card information to one or more digital wallets resident on the computing device 110, the user may utilize an input interface (such as a keyboard and/or touchscreen) associated with the computing device 110 to cause the computing device 110 to open a digital wallet management application. Touch gestures, for example, may be used to select an icon associated with the digital wallet management application.

Once the digital wallet management application has been opened on the computing device 110, the user may be required to enter authentication information such as for example a username and password. When the user has been authenticated, the computing device 110 may display a graphical user interface (GUI) of the digital wallet management application. As will be described in more detail below, the digital wallet management application, together with the application server 120, may be used to update or add account information such as for example payment card information to one or more digital wallets resident on the computing device 110. The digital wallet management application may determine the digital wallets resident on the computing device 110 during a configuration process and this may be done automatically or may require input from the user selecting which digital wallets to associate with the digital wallet management application. The user may be required to enter a username and password for each particular digital wallet within the digital wallet management application and this information may be stored by the application server 120 of the digital wallet management application. For example, the application server 120 may send a signal to the computing device 110, the signal causing the computing device 110 to display an interface requesting that the user authenticate at each digital wallet to be managed by the digital wallet management application.

As mentioned, the digital wallet management application, together with the application server 120, may be used for digital wallet management. FIG. 5 is a flowchart showing operations performed by the application server 120 in digital wallet management according to an embodiment. The operations may be included in a method 500 which may be performed by the application server 120. For example, computer-executable instructions stored in memory of the application server 120 may, when executed by one or more processors, configure the application server 120 to perform the method 500 or a portion thereof.

The application server 120 provides, via the communications module and to the computing device 110, a signal causing the computing device 110 to display an interface of a digital wallet management application, the interface allowing one or more digital wallets to be selected (step 510).

Figure 6:
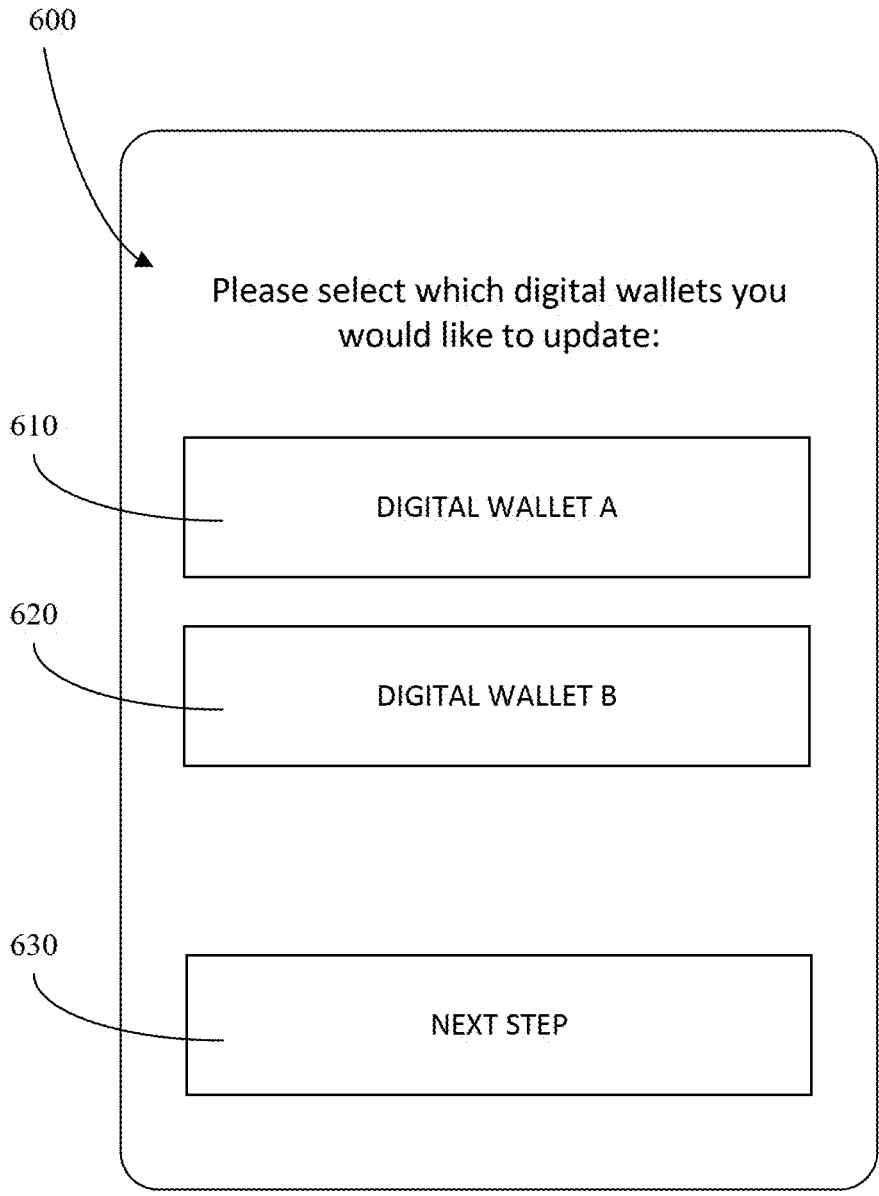
FIG. 6 is an example interface displayed on a display screen of a computing device according to an embodiment.

An example interface 600 is shown in FIG. 6. In this example, the interface 600 includes a first selectable option 610 associated with a first digital wallet application ("Digital Wallet A") and a second selectable option 620 associated with a second digital wallet application ("Digital Wallet B"). Each selectable option 610, 620 may be selected by the user of the computing device 110 via touch input. For example, the user may select the first selectable option 610 via touch input on the display screen of the computing device 110. The first selectable option 610 and the second selectable option 620 are selected by the user to identify which digital wallet applications the user would like to update the account information for or add account information to. The account information may be for example payment card information.

Although only two (2) selectable options associated with digital wallet applications are shown, it will be appreciated that any number of selectable options associated with digital wallet applications may be displayed and that the number selectable options provided may be related to how many digital wallet applications are resident on the computing device 110. As mentioned, this may be determined during a configuration process of the digital wallet management application.

The interface 600 includes a third selectable option 630 which, when selected, indicates that the user has completed selecting the digital wallets to be updated.

The application server 120 receives, via the communications module and from the computing device 110, a signal indicating a selection of the one or more digital wallets (step 520).

Figure 7:
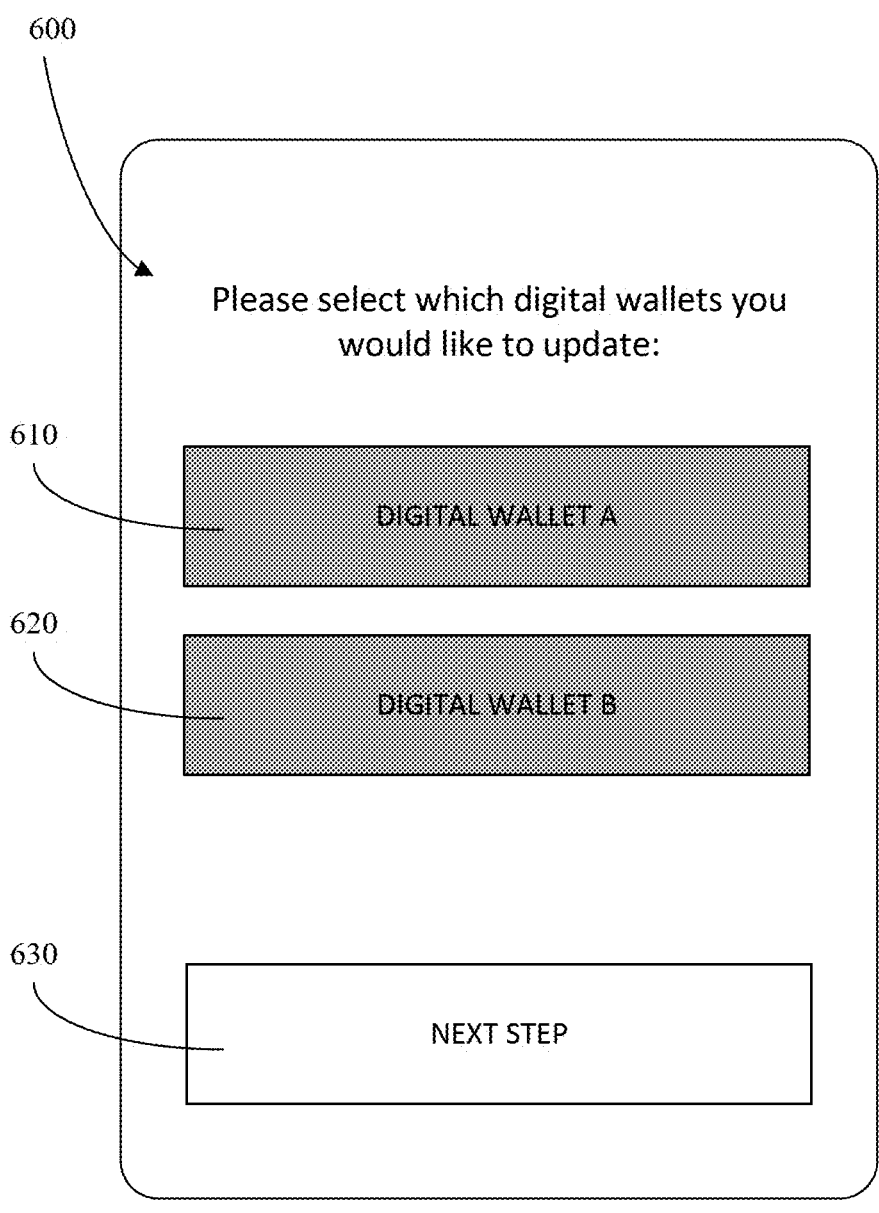
FIG. 7 is an example interface displayed on a display screen of a computing device according to an embodiment.

In this embodiment, the user selects one or more of the selectable options 610, 620 to indicate which digital wallets to be updated. An example is shown in FIG. 7. As can be seen, the user has selected the first selectable option 610 indicating that the user would like to update Digital Wallet A and the second selectable option 620 indicating that the user would like to update Digital Wallet B. The interface 600 may identify that a selectable option has been selected by, for example, changing or adjusting the appearance of the selectable option. For example, as shown in FIG. 7, the first and second selectable options 610, 620 are displayed in a different colour (compared to FIG. 6) indicating that they have been selected by the user.

The user confirms the selection by selecting the third selectable option 630 and this indicates that the user would like to continue to the next step. In response the user selecting the third selectable option 630, the computing device 110 sends a signal to the application server 120 indicating the selection of the one or more digital wallets.

The application server 120 receives, via the communications module and from the computing device 110, a signal indicating a request to push account information to the selected one or more digital wallets (step 530).

Figure 8:
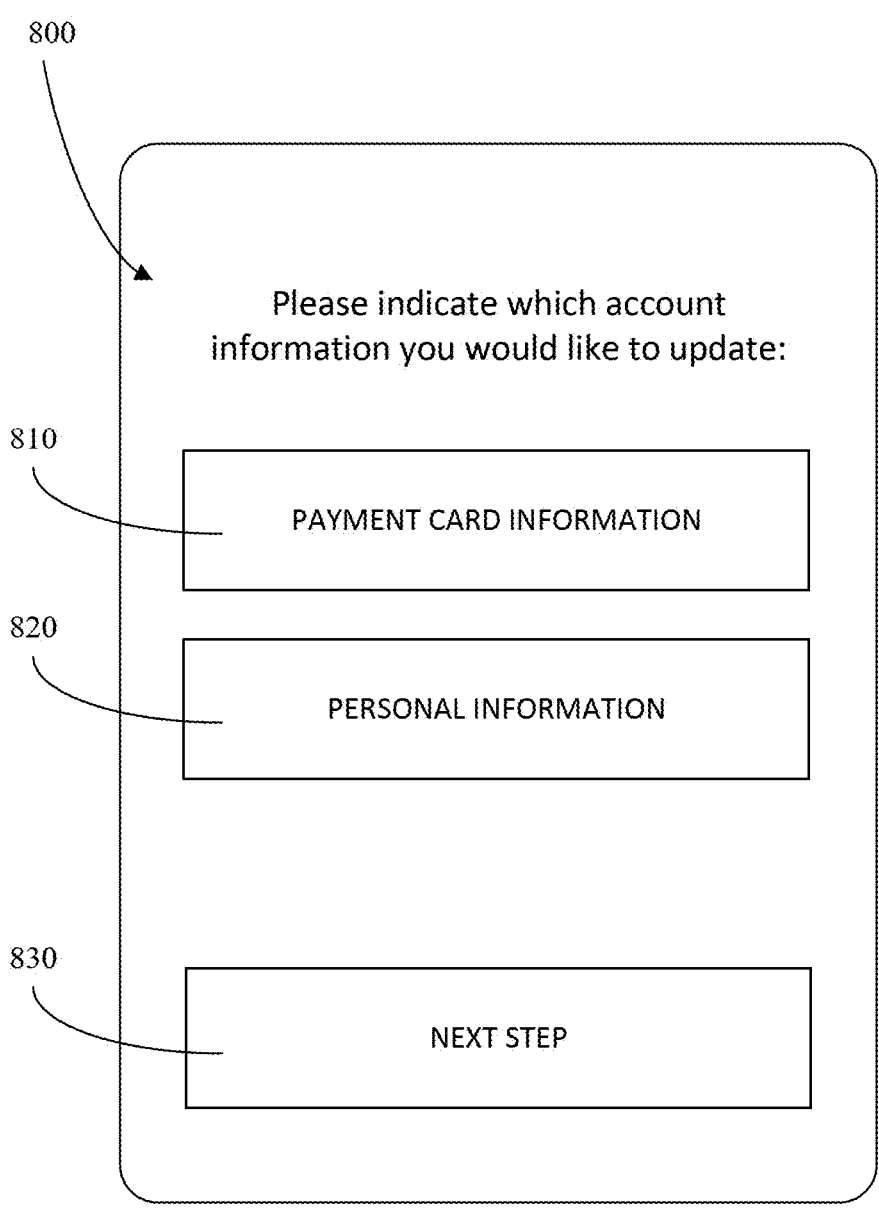
FIG. 8 is an example interface displayed on a display screen of a computing device according to an embodiment.

In this embodiment, once the digital wallets have been selected, the application server 120 may send, via the communications module and to the computing device 110, a signal causing an interface to be displayed. An example interface 800 is shown in FIG. 8. In this example, the interface 800 includes a first selectable option 810 associated with updating payment card information and a second selectable option 820 associated with updating personal information. Each selectable option 810, 820 may be selected by the user of the computing device 110 via touch input. For example, the user may select the first selectable option 810 via touch input on the display screen of the computing device 110. The first selectable option 810 may be selected by the user to indicate that they would like to update payment card information for the digital wallets selected during step 520. The second selectable option 820 may be selected by the user to indicate that they would like to update personal information for the digital wallets selected during step 520. Personal information may include, for example, a name, email address, telephone number, a billing address, a shipping address, etc.

The interface 800 includes a third selectable option 830 which, when selected, indicates that the user has completed selecting the type or types of information to be updated.

The user may select the first selectable option 810 and/or the second selectable option 820 and may then select the third selectable option 830 to proceed. As an example, the user may select the first selectable option 810 to indicate that the user would like to update payment card information for the digital wallets selecting during step 520, specifically Digital Wallet A and Digital Wallet B. The user may then select the third selectable option 830 indicating that they would like to proceed.

Figure 9:
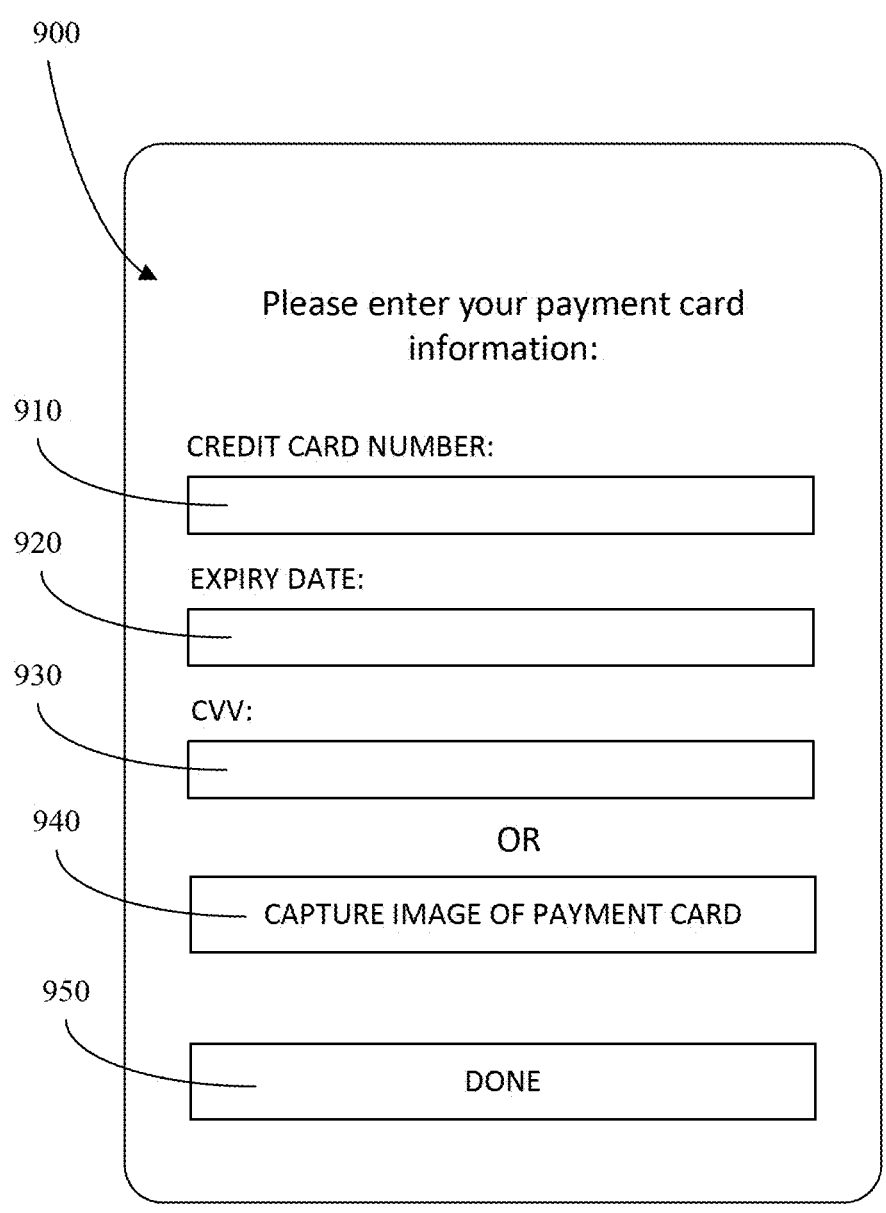
FIG. 9 is an example interface displayed on a display screen of a computing device according to an embodiment.

In response, the application server 120 may send, via the communications module, a signal causing the computing device 110 to display an interface. An example interface 900 is shown in FIG. 9. In this example, the interface 900 includes a first text field 910, a second text field 920, a third text field 930, a selectable option 940 and a selectable option 950.

The first text field 910 may be selected by the user and in response, the computing device 110 may display a virtual keyboard on the display screen thereof. The user may then enter the payment card number using the virtual keyboard. Similarly, the second text field 920 may be completed using the virtual keyboard to enter an expiration date of the payment card and the third text field 930 may be completed using the virtual keyboard to enter the Card Verification Value (CVV) code of the payment card.

Alternatively, the user may select the selectable option 940 to capture an image of the value card. For example, when the user selects the selectable option 940 this may cause the computing device 110 to open the camera of the image capture module 220 prompting the user to capture an image of the value card. The image of the value card may be processed, for example, using Optical Character Recognition (OCR) algorithms to automatically determine the payment card number, expiry date and CVV code.

Once the user has completed providing the payment card information, the user may select the selectable option 950 and this may cause the computing device 110 to send a signal to the application server 120 indicating a request to push account information to the selected one or more digital wallets.

The application server 120 sends, via the communications module, a signal configuring the one or more servers to add the account information to the one or more digital wallets (step 540). In this embodiment, the application server 120 sends the signal configuring the one or more servers to add the account information to the one or more digital wallets via an application programing interface (API) configured to push account information to the servers associated with the digital wallets selected during step 520. For example, the application server 120 may send a signal to the server associated with the first digital wallet and the server associated with the second digital wallet to update payment card information. The signal may include identifying information of the user as well as the updated payment card information.

The server 140 associated with the first digital wallet and the server 150 associated with the second digital wallet update the account information for the user and as such the next time the user opens or accesses the first digital wallet or the second digital wallet on the computing device 110, the account information is up to date. For example, the next time the user opens the first digital wallet the payment card information is updated and ready for use. In this manner, account information such as for example payment card information is pushed from the application server 120 to the servers 140, 150 associated with the first and second digital wallets, respectively. The user is thus able to simultaneously add or update account information to all digital wallets resident on the computing device 110 within a single digital wallet management application. Put another way, a common interface is used to push account information to multiple digital wallets so that account information is added or linked to the multiple digital wallets.

As mentioned, the first digital wallet and/or the second digital wallet may be pre-funded digital wallets and as such in some embodiments the first digital wallet and/or the second digital wallet may receive funds via the digital wallet management application. The application server 120 may be used to send funds from an account such as a bank account or a credit card account to the first digital wallet and/or second digital wallet.

FIG. 10 is a flowchart showing operations performed by the application server 120 according to an embodiment. The operations may be included in a method 1000 which may be performed by the application server 120. For example, computer-executable instructions stored in memory of the application server 120 may, when executed by one or more processors, configure the application server 120 to perform the method 1000 or a portion thereof.

The application server 120 provides, via the communications module and to the computing device 110, a signal causing the computing device 110 to display an interface of a digital wallet management application, the interface allowing one or more digital wallets to be selected (step 1010). Step 1010 is generally similar to that described herein with reference to step 510 and an interface similar to interface 600 is displayed on the computing device 110.

The application server 120 receives, via the communications module and from the computing device 110, a signal indicating a selection of the one or more digital wallets (step 1020). In this embodiment, the user selects which digital wallets are to be funded and this is done in a manner similar to that described herein with reference to step 520.

The application server 120 receives, via the communications module and from the computing device 110, a signal indicating a request to transfer funds of a defined amount to the selected one or more digital wallets (step 1030).

Figure 11:
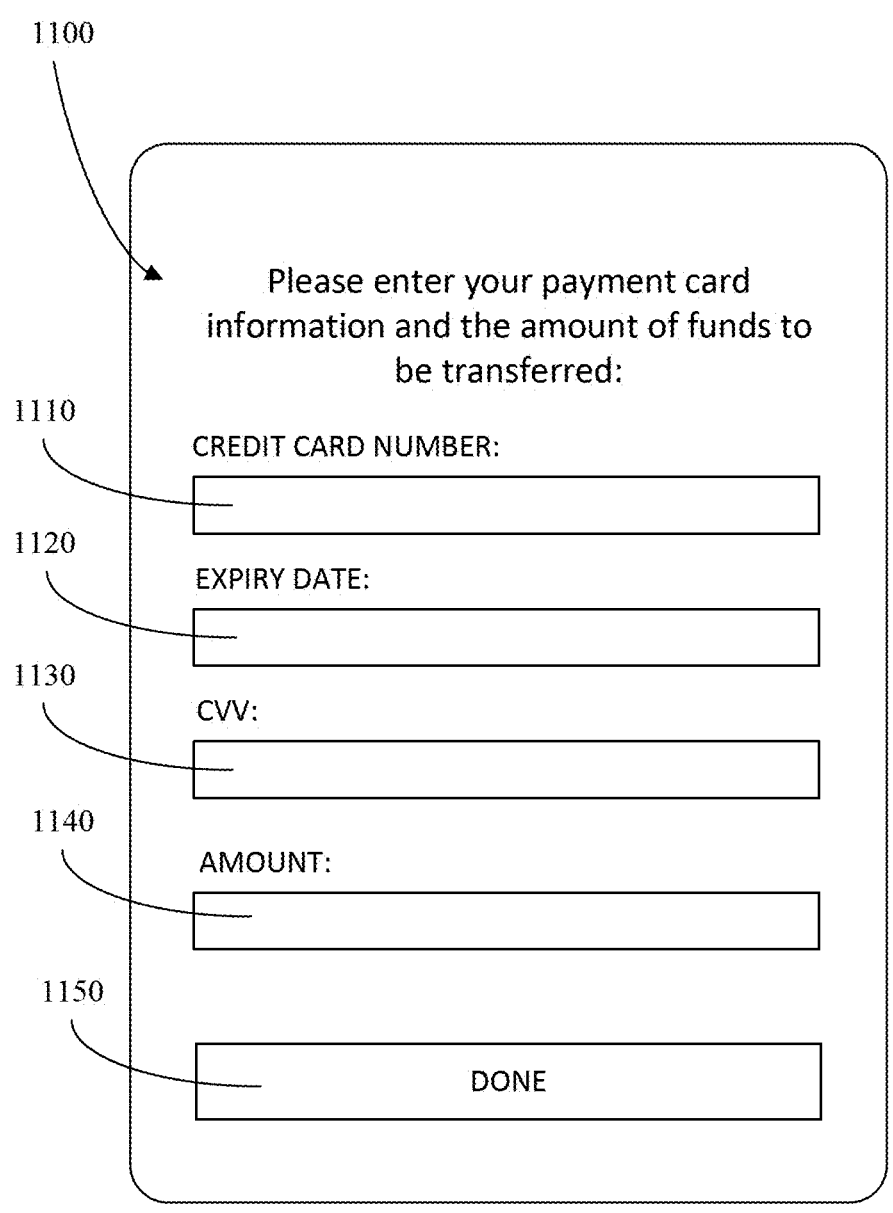
FIG. 11 is an example interface displayed on a display screen of a computing device according to an embodiment.

In this embodiment, the application server 120 may provide an interface to complete the request to transfer funds of a defined amount to the selected one or more digital wallets. An example interface 1100 is shown in FIG. 11. In this example, the interface 1100 includes a first text field 1110, a second text field 1120, a third text field 1130, a fourth text field 1140 and a selectable option 1150.

The first text field 1110 may be selected by the user and in response, the computing device 110 may display a virtual keyboard on the display screen thereof. The user may then enter the payment card number using the virtual keyboard. Similarly, the second text field 1120 may be completed using the virtual keyboard to enter an expiration date of the payment card, the third text field 1130 may be completed using the virtual keyboard to enter the Card Verification Value (CVV) code of the payment card and the fourth text field 1140 may be completed using the virtual keyboard to enter the defined amount of funds to be transferred.

The selectable option 1150 may be selected by the user to indicate that the user is ready to transfer funds.

Figure 12:
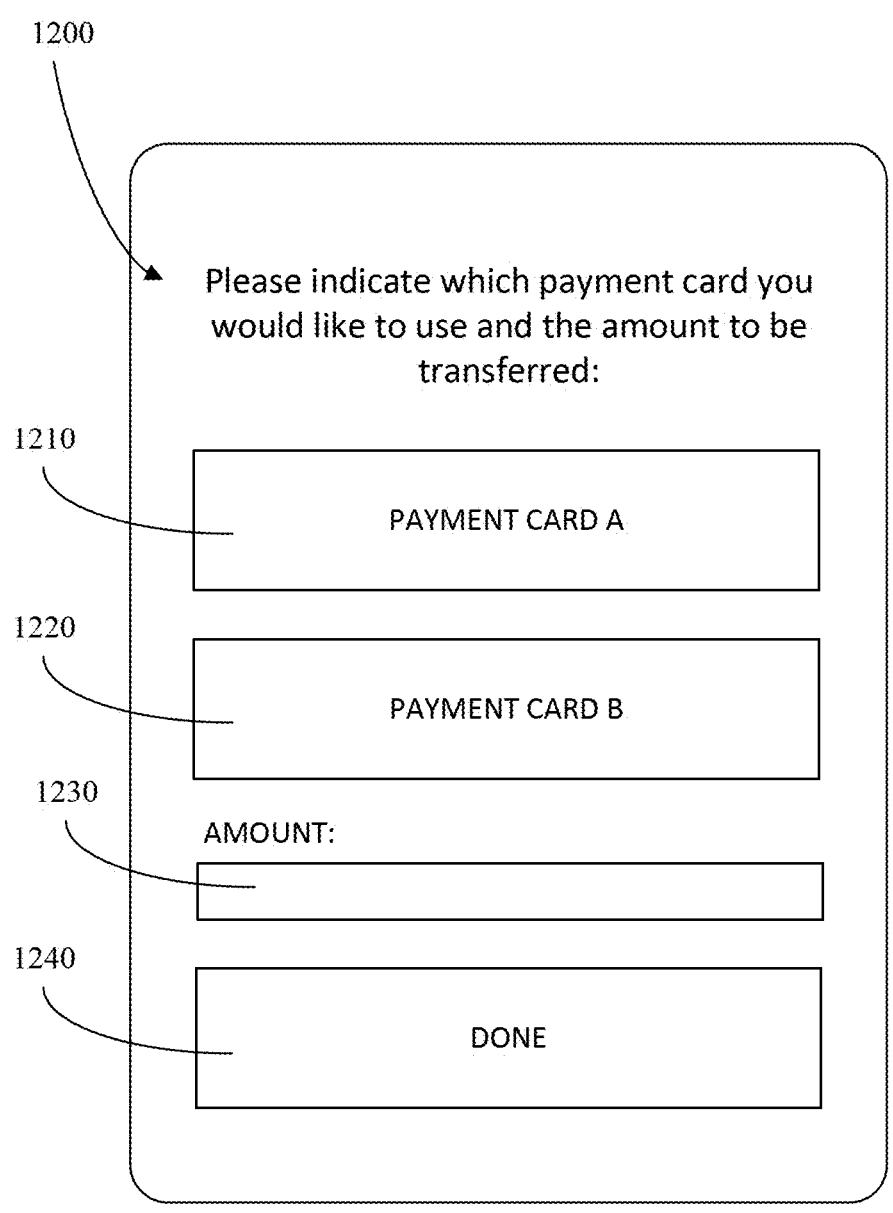
FIG. 12 is an example interface displayed on a display screen of a computing device according to an embodiment.

In another example, payment card information may have been previously obtained by the application server 120 and stored in memory. As such, rather than requiring the user enter the payment card information, the application server 120 may obtain the payment card information from memory. The application server 120 may provide an interface to complete the request to transfer funds of a defined amount to the selected one or more digital wallets. An example interface 1200 is shown in FIG. 12. In this example, the interface 1200 includes a first selectable option 1210 associated with a first payment card (Payment Card A) and a second selectable option 1220 associated with a second payment card (Payment Card B). Each selectable option 1210, 1220 may be selected by the user of the computing device 110 via touch input. For example, the user may select the first selectable option 1210 via touch input on the display screen of the computing device 110. The first selectable option 1210 may be selected by the user to indicate that they would like to transfer funds using Payment Card A and the second selectable option 1220 may be selected by the user to indicate that they would like to transfer funds using Payment Card B.

The interface 1200 includes a first text field 1230. The first text field 1230 may be selected by the user and in response, the computing device 110 may display a virtual keyboard on the display screen thereof. The user may then enter the amount of funds to be transferred using the virtual keyboard. Put another way, the first text field 1230 may be completed to enter the amount of funds to be transferred.

The interface 1200 includes a third selectable option 1240 which, when selected, indicates that the user is ready to transfer funds.

The user selects selectable option 1150 (FIG. 11) or selectable option 1240 (FIG. 12) to indicate that they are ready to transfer funds and as such a signal is sent from the computing device 110. In response, the application server 120 receives, via the communications module and from the computing device 110, the signal indicating a request to transfer funds of a defined amount to the selected one or more digital wallets.

The application server 120 sends, via the communications module and to a server associated with the payment card, a signal to transfer funds of the defined amount to the one or more digital wallets (step 1040). In this embodiment, the signal includes identifying information of the user, payment card information, the defined amount of funds to be transferred, and identifying information for the account of the user at each digital wallet. The application server 120 sends the signal to transfer funds of the defined amount to a server, such as a financial institution server or credit card provider server, associated with the payment card to complete the transfer of funds.

The application server 120 sends, via the communications module and to the server associated with the digital wallet receiving the funds, a signal indicating the transfer of funds of the defined amount (step 1050). For example, the application server 120 may send a signal to the server associated with the first digital wallet indicating that a transfer of funds of the defined amount has been initiated. This may be done using an API as described herein. In this manner, funds may be pushed or transferred to one or more pre-funded digital wallets simultaneously. The user is thus able to simultaneously pre-fund multiple pre-funded digital wallets resident on the computing device 110 within a single digital wallet management application. Put another way, a common interface may be used to push funds to multiple pre-funded digital wallets.

Figure 13:
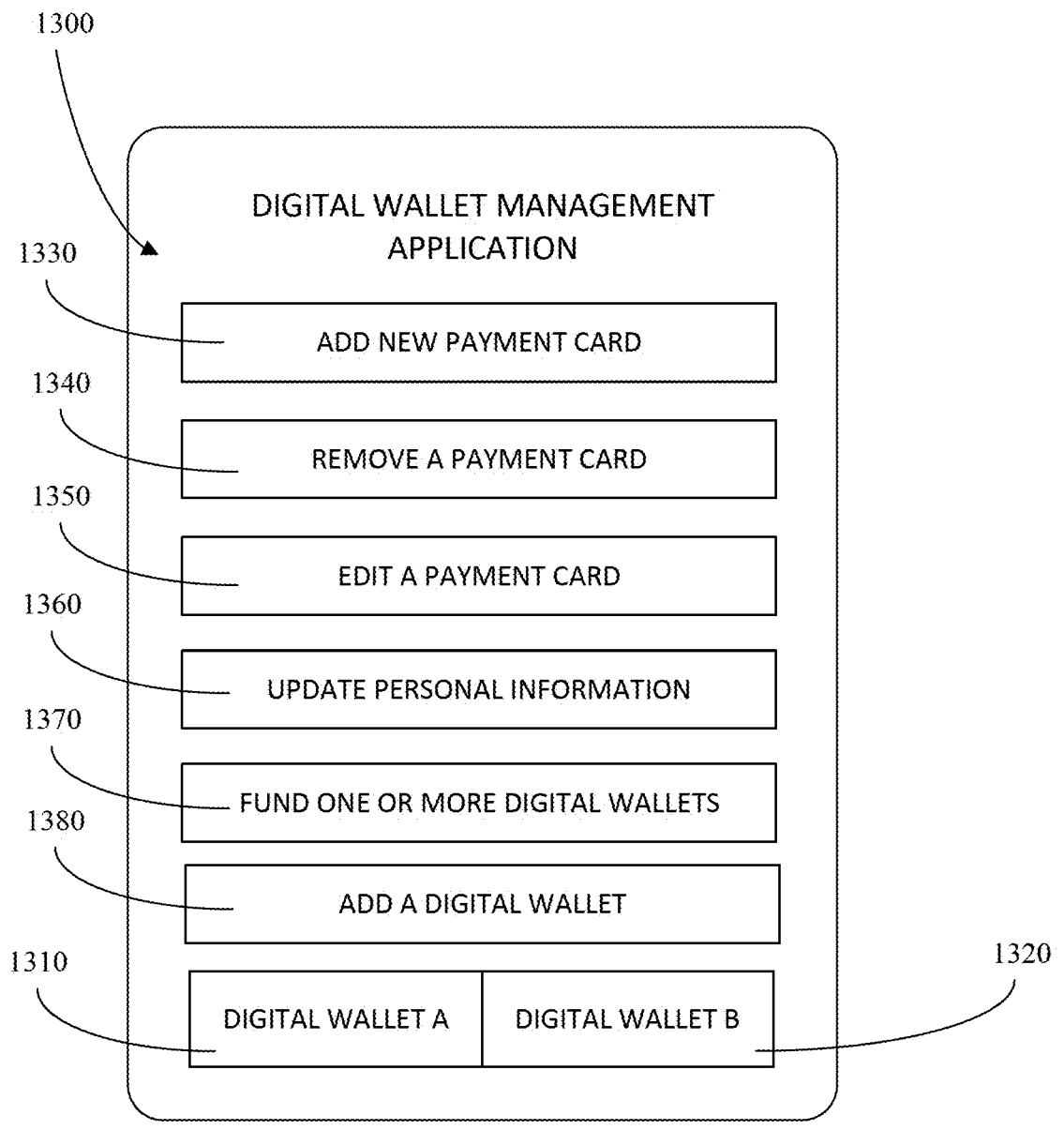
FIG. 13 is an example interface displayed on a display screen of a computing device according to an embodiment.

In some embodiments, the digital wallet management application may include one or more icons displaying information regarding the one or more digital wallets. An example is shown in FIG. 13 where an interface 1300 is displayed on the computing device 110. The interface 1300 may be provided by the application server 120 once the user has logged into or opened the digital wallet management application on the computing device 110. As can be seen, the interface 1300 includes a first selectable option 1310 associated with Digital Wallet A and a second selectable option 1320 associated with Digital Wallet B. The first selectable option 1310, when selected, causes the computing device 110 to open Digital Wallet A on the computing device 110 and the second selectable option 1320, when selected, causes the computing device 110 to open Digital Wallet B.

The interface 1300 also includes selectable option 1330 that, when selected, causes the computing device 110 to send a signal to the application server 120 to initiate a method of adding a new payment card in manners similar to that described herein. The interface 1300 includes selectable option 1340 that, when selected, causes the computing device 110 to send a signal to the application server 120 to initiate a method of removing a payment card. The interface 1300 includes selectable option 1350 that, when selected, causes the computing device 110 to send a signal to the application server 120 to initiate a method of editing a payment card in manners similar to that described herein. The interface 1300 includes selectable option 1360 that, when selected, causes the computing device 110 to send a signal to the application server 120 to initiate a method of updating personal information in manners similar to that described herein. The interface 1300 includes selectable option 1370 that, when selected, causes the computing device 110 to send a signal to the application server 120 to initiate a method of transferring funds to one or more digital wallets in manners similar to that described herein. The interface 1300 includes a selectable option 1380 that, when selected, causes the computing device 110 to send a signal to the application server 120 to initiate a method of adding a digital wallet in manners similar to that described herein.

Figure 14:
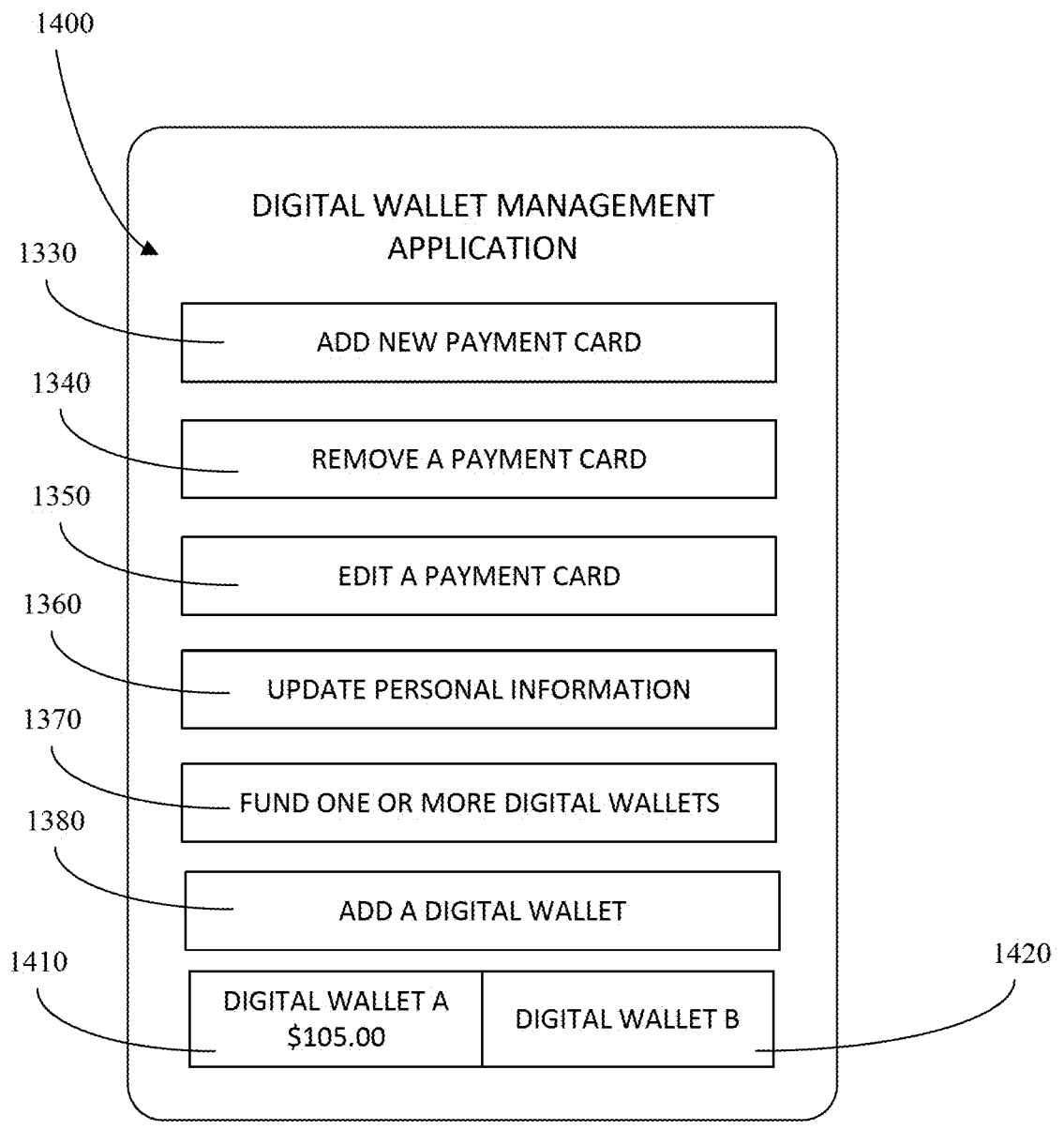
FIG. 14 is an example interface displayed on a display screen of a computing device according to an embodiment.

In some embodiments wherein one or more of digital wallets are pre-funded digital wallets, the icons displaying information regarding the one or more digital wallets may include a balance of the digital wallet. An example is shown in FIG. 14 where an interface 1400 is displayed on the computing device 110. The interface 1400 is generally similar to that of interface 1300 with the exception that the first selectable option 1410 additionally displays the balance of the account of Digital Wallet A, where Digital Wallet A is a pre-funded digital wallet. It is noted that in this example Digital Wallet B is not a pre-funded digital wallet and as such the second selectable option 1420 does not show a balance.

In one or more embodiment, the application server 120 may be associated with a financial institution or payment card provider. In this embodiment, rather than requiring the user to manually enter payment card information, the application server 120 may obtain payment card information from a database or other storage device.

Figure 15:
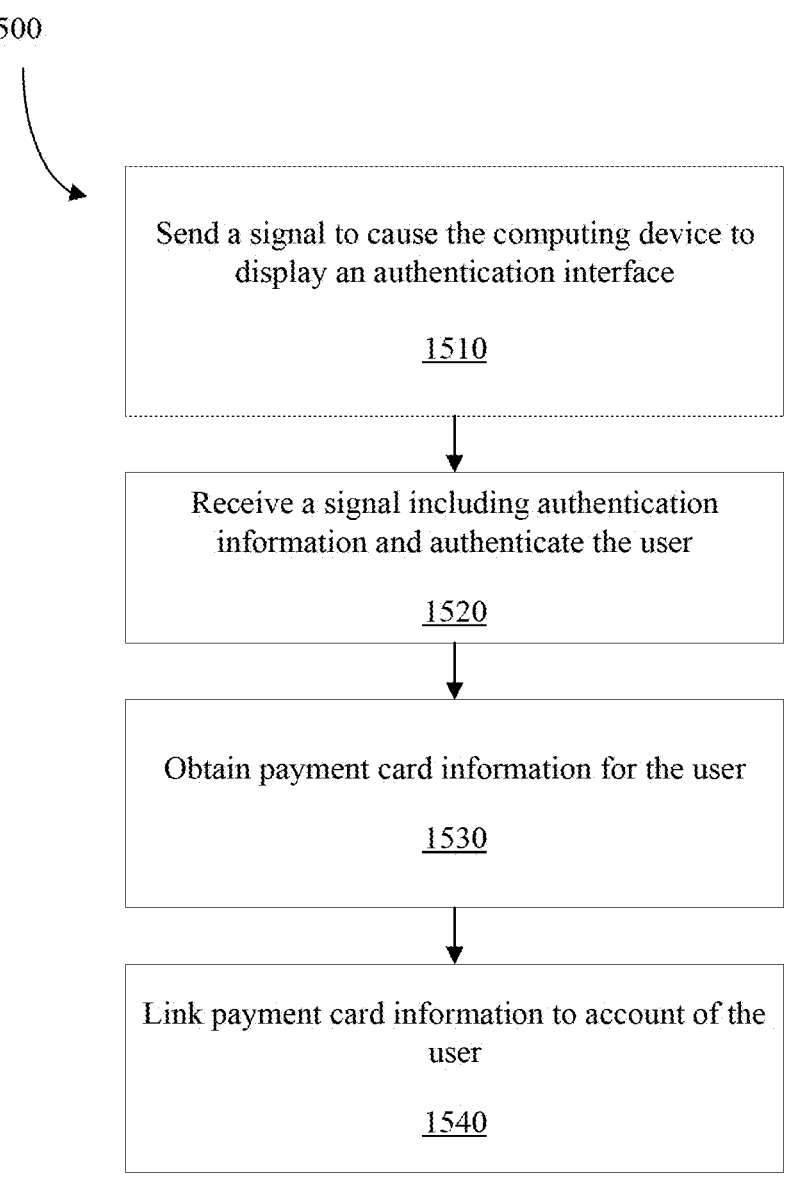
FIG. 15 is a flowchart showing operations performed by a server in obtaining payment card information according to an embodiment.

FIG. 15 is a flowchart showing operations performed by the application server 120 in obtaining payment card information according to an embodiment. The operations may be included in a method 1500 which may be performed by the application server 120. For example, computer-executable instructions stored in memory of the application server 120 may, when executed by one or more processors, configure the application server 120 to perform the method 1500 or a portion thereof.

The method 1500 beings when the user opens the digital wallet management application on the computing device 110. In response, the application server 120 sends, via the communications module and to the computing device 110, a signal causing the computing device 110 to display an authentication interface (step 1510). The authentication interface may require the user to enter a username and password or may require the user to provide biometric data such as for example a fingerprint using one or more input interfaces of the computing device 110.

The application server 120 receives, via the communications module and from the computing device 110, a signal including authentication information and authenticates the user (step 1520). In this embodiment, the application server 120 may compare the received authentication information to a database containing stored authentication information to authenticate the user. For example, the application server 120 may compare the username and password to a database to authenticate the user.

Once the user has been authenticated, the application server 120 obtains payment card information for any payment card accounts held by the user at the financial institution or payment card provider (step 1530). In this embodiment, the payment card information may be obtained from a database, for example.

The application server 120 links the payment card information to a digital wallet management application account of the user (step 1540). The application server 120 may store the payment card information in a database and associate the stored payment card information to the account of the user.

The payment card information is thus available to the user within the digital wallet management interface. As such, the user may select one or more digital wallets and add the obtained payment card information to the one or more digital wallets in a manner similar to that described herein. In this manner, each time the user receives or obtains a new payment card, the new payment card information may be readily available to the user within the digital wallet management application and thus can be easily added to the one or more digital wallets. In embodiments where one or more of the digital wallets are pre-funded digital wallets, the user may be required to provide authorization to charge the new payment card to pre-fund the one or more digital wallets. The user may provide authorization by providing biometric data such as for example a fingerprint using one or more input interfaces of the computing device 110. It will be appreciated that the user may still add payment cards to their account using the digital wallet management application in manners similar to that described herein, even if the payment cards are not issued by the same financial institution or payment card provider associated with the digital wallet management application.

The methods described herein may be modified and/or operations of such methods combined to provide other methods.

Example embodiments of the present application are not limited to any particular operating system, system architecture, mobile device architecture, server architecture, or computer programming language.

It will be understood that the applications, modules, routines, processes, threads, or other software components implementing the described method/process may be realized using standard computer programming techniques and languages. The present application is not limited to particular processors, computer languages, computer programming conventions, data structures, or other such implementation details. Those skilled in the art will recognize that the described processes may be implemented as a part of computer-executable code stored in volatile or non-volatile memory, as part of an application-specific integrated chip (ASIC), etc.

As noted, certain adaptations and modifications of the described embodiments can be made. Therefore, the herein discussed embodiments are considered to be illustrative and not restrictive.

What is claimed is:

1. A server comprising:

a communications module;

a processor coupled with the communications module; and a memory coupled to the processor and storing processor-executable instructions which, when executed by the processor, cause the processor to perform the steps of:

displaying, on a remote computing device, an interface of a digital wallet management application, the interface of the digital wallet management application including selectable interface elements that, when selected, allow one or more digital wallets to be selected;

receiving, via the communications module and from the remote computing device, an indication of a selection of at least two digital wallets;

receiving, via the communications module and from the remote computing device, an indication of a request to push account information to the selected at least two digital wallets; and pushing the account information simultaneously to at least two third party servers associated with the at least two digital wallets by engaging at least two application programming interfaces in communication with at least two third party servers associated with the at least two digital wallets.

2. The server of claim 1, wherein the processor-executable instructions, when executed by the processor, further cause the processor to perform the steps of:

authenticating a user of the remote computing device; and automatically adding the account information to the digital wallet management application based on authentication information obtained during the authenticating.

3. The server of claim 2, wherein the authentication information includes at least one of a username, a password, or biometric data of the user.

4. The server of claim 1, wherein the processor-executable instructions, when executed by the processor, further cause the processor to perform the steps of:

receiving, via the communications module and from the remote computing device, a request to transfer funds of a defined amount to one or more of the digital wallets;

in response to receiving the request to transfer funds of the defined amount, sending, via the communications module and to a server associated with the account information, the request to transfer funds of the defined amount to the one or more digital wallets; and sending, via the communications module and to the one or more servers associated with the one or more digital wallets, an indication of the transfer of funds of the defined amount to the one or more digital wallets.

5. The server of claim 4, wherein the request to transfer funds of the defined amount to one or more of the digital wallets includes information identifying the account information to be used to transfer the funds to the one or more digital wallets.

6. The server of claim 1, wherein the processor-executable instructions, when executed by the processor, further cause the processor to perform the steps of:

sending, via the communications module and to the remote computing device, a request for a user to authenticate at the at least two third party servers associated with the at least two digital wallets.

7. The server of claim 6, wherein the request for the user to authenticate at the at least two third party servers associated with the at least two digital wallets includes displaying, on the remote computing device, an interface that includes information requesting authentication information for the at least two third party servers associated with the at least two digital wallets.

8. The server of claim 7, wherein the interface that includes information requesting authentication information is displayed within the digital wallet management application.

9. The server of claim 1, wherein the interface of the digital wallet management application includes one or more icons displaying information regarding the one or more digital wallets, the one or more icons selectable to open a mobile application associated with a particular digital wallet.

10. The server of claim 1, wherein the account information includes payment card information.

11. A computer-implemented method performed by a processor of a server, the method comprising:

displaying, on a remote computing device, an interface of a digital wallet management application, the interface of the digital wallet management application including selectable interface elements that, when selected, allow one or more digital wallets to be selected;

receiving, via the communications module and from the remote computing device, an indication of a selection of at least two digital wallets;

receiving, via the communications module and from the remote computing device, an indication of a request to push account information to the selected at least two digital wallets; and pushing the account information simultaneously to at least two third party servers associated with the at least two digital wallets by engaging at least two application programming interfaces in communication with at least two third party servers associated with the at least two digital wallets.

12. The computer-implemented method of claim 11, further comprising:

authenticating a user of the remote computing device; and automatically adding the account information to the digital wallet management application based on authentication information obtained during the authenticating.

13. The computer-implemented method of claim 12, wherein the authentication information includes at least one of a username, a password, or biometric data of the user.

14. The computer-implemented method of claim 11, further comprising:

receiving, via the communications module and from the remote computing device, a request to transfer funds of a defined amount to one or more of the digital wallets;

in response to receiving the request to transfer funds of the defined amount, sending, via the communications module and to a server associated with the account information, the request to transfer funds of the defined amount to the one or more digital wallets; and send, via the communications module and to the one or more servers associated with the one or more digital wallets, an indication of the transfer of funds of the defined amount to the one or more digital wallets.

15. The computer-implemented method of claim 11, further comprising:

sending, via the communications module and to the remote computing device, a request for a user to authenticate at the at least two third party servers associated with the at least two digital wallets.

16. The computer-implemented method of claim 15, wherein the request for the user to authenticate at the at least two third party servers associated with the at least two digital wallets includes displaying, on the remote computing device, an interface that includes information requesting authentication information for the at least two third party servers associated with the at least two digital wallets.

17. The computer-implemented method of claim 11, wherein the account information includes payment card information.

18. A non-transitory computer readable storage medium comprising computer-executable instructions which, when executed by a processor, a cause the processor to perform the steps of:

displaying, on a remote computing device, an interface of a digital wallet management application, the interface of the digital wallet management application including selectable interface elements that, when selected, allow one or more digital wallets to be selected;

receiving, via the communications module and from the remote computing device, an indication of a selection of at least two digital wallets;

receiving, via the communications module and from the remote computing device, an indication of a request to push account information to the selected at least two digital wallets; and pushing the account information simultaneously to at least two third party servers associated with the at least two digital wallets by engaging at least two application programming interfaces in communication with at least two third party servers associated with the at least two digital wallets.

* * * * *